L. I. BREAKEY.
AUTOMATIC SHUT-OFF FOR WATER GAGE GLASSES.
APPLICATION FILED JAN. 8, 1918.
1,361,303.
Patented Dec. 7, 1920.
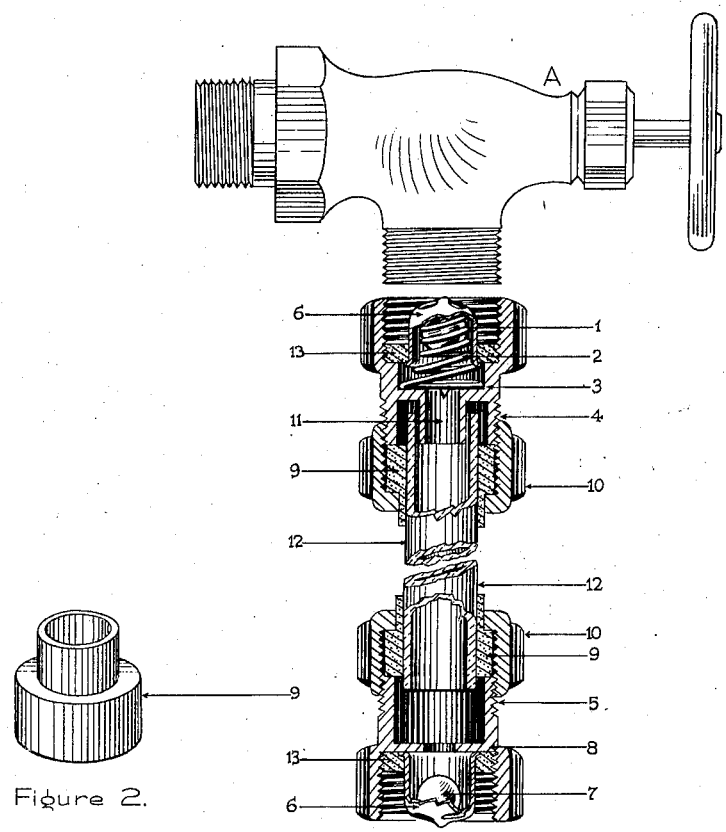
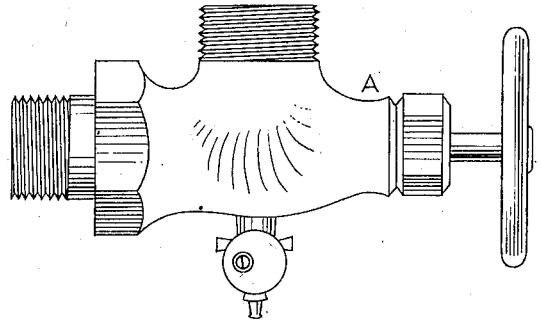
Figure 2.
Figure 1.
Lewis I. Breakey,
Inventor

UNITED STATES PATENT OFFICE.

LEWIS I. BREAKLEY, OF MARSHALL, MICHIGAN.

AUTOMATIC SHUT-OFF FOR WATER-GAGE GLASSES.

1,361,303.  Specification of Letters Patent.  Patented Dec. 7, 1920.

Application filed January 8, 1918. Serial No. 210,880.

*To all whom it may concern:*

Be it known that I, LEWIS I. BREAKLEY, a citizen of the United States, residing at Marshall, in the county of Calhoun and State of Michigan, have invented a new and useful Safety Automatic Shut-Off for Water-Gage Glasses, of which the following is a specification, such as will enable others skilled in the art to which it appertains to make and use the same, reference being had to the accompanying drawings, and to the letters and figures of reference marked thereon, which form a part of this specification.

My invention relates to improvements in automatic shutoffs for gage glasses, and the object of my invention is:

First, To provide a safety automatic shut-off for water gage glasses now in use.

Second, The method of attaching an automatic shutoff to any and all water gages, steam separators, and sight feed glass fixtures in common use by screwing it on to the gage or fixtures in place of the packing nuts. It operates separately and independently of the gage or fixtures.

I attain these objects by the mechanism illustrated in the accompanying drawings in which:—

Figure 1 is a vertical view of a common water gage partly in section, with which my invention is shown.

Fig. 2, is a perspective view of my special gasket used on my safety automatic shutoff.

Similar letters and figures refer to similar parts in both views.

In Fig. 1, A and A are fixtures such as are in common use, 4 is an upper coupler, 5 is a lower coupler, 1 is an upper ball which is fastened to coil spring 2, 3 is an upper ball seat which has two small by-paths that insure perfect safety, and act as an alarm when the glass is broken, by the blowing of the escaping steam. 6 and 6 are ball retainers, 7 is the lower ball, 8 is the lower ball seat, 10 and 10 are packing nuts specially adapted to receive the special gasket 9. 11 is a short tube part of coupler 4 extending a short distance into the glass tube 12, which prevents the wearing away of the glass tube. 13 and 13 are common gaskets which hold ball retainers 6 and 6 in couplers 4 and 5 and seats couplers 4 and 5 to fixtures A and A.

In Fig. 2, 9 is a cylindrical gasket having a circular shoulder with a plane or level surface and a thin tubular flange extending upwardly from the base, which projects through the packing nuts as shown in Fig. 1. This gasket fits into packing nuts 10 and 10 to seat glass tube 12 to couplers 4 and 5, as shown in Fig. 1.

The operation of the device is as follows:

When the glass is broken it starts a heavy current of water upward through the lower coupler which carries the lower ball up to the ball seat closing it instantly, and the upper ball is forced down to the ball seat by the heavy pressure of steam through the upper coupler, which is only caused by the breaking of the glass.

The leakage of steam through the by-paths of the upper ball seat acts as an alarm indicating that the glass is broken and causes the balls to drop back the instant the glass is replaced.

I am aware that prior to my invention, automatic shutoffs were made in the gage and are a part of the gage or fixtures and operate within the gage. I therefore, claim my invention differs from all others, in that it is made separate and independent of the gage or fixtures and operates separately and independently and can be attached to any and all gages now in use.

Having thus described my invention, what I claim as new and desire to secure by Letters Patent is,—

1. A safety automatic shut-off for gage glasses, comprising couplers 4 and 5, special gaskets 9, said couplers being exteriorly threaded at one end, and interiorly threaded at the other end, interiorly threaded packing nuts 10 and 10, the exterior threads of each coupler being adapted to receive one of said packing nuts which holds one of said special gaskets, a glass tube 12 seated in said gaskets, the interior threads of said couplers being adapted to receive the fixtures A and A to the boiler or column, the said upper coupler 4 being provided with a short tube 11, which extends into the glass, the upper end of said tube having a ball seat which has two by-paths, the lower coupler 5 being provided with a ball seat, balls to coöperate with said seats and supporting means for said balls, substantially as specified.

2. A safety automatic shut-off for gage glasses, comprising upper and lower couplers, a glass tube connecting said couplers, each of said couplers being provided with a roomy water passage therethrough, and having ball seats and suitable balls for ball valves, ball retainers to hold the ball valves in said couplers, and a coil spring in said upper coupler which normally holds the upper ball away from the ball seat, substantially as specified.

3. A safety automatic shut-off for gage glasses comprising upper and lower couplers each threaded at each end, and having ball seats, by-paths in the upper ball seat, suitable packing nuts, on said couplers, balls to coöperate with said ball seats for valves, ball retainers in said couplers, and gaskets to properly seat the couplers to the common fixtures, a glass tube between the couplers, special gaskets to seat the glass tube to said couplers, and the ball valves arranged to close automatically upon the breaking of the glass, substantially as specified.

In testimony whereof, I affix my signature in the presence of two witnesses.

LEWIS I. BREAKEY.

Witnesses:
KATHERINE WATSON,
ORION E. WALKER.